United States Patent
Bandyopadhyay et al.

(10) Patent No.: US 10,389,837 B2
(45) Date of Patent: Aug. 20, 2019

(54) MULTI-TIER DYNAMIC DATA CACHING

(71) Applicant: International Business Machines Corporation, Armonk, NY (US)

(72) Inventors: Santanu Bandyopadhyay, Kolkata (IN); Ramesh C. Pathak, Bangalore (IN); Suryanarayana K. Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 15/185,098

(22) Filed: Jun. 17, 2016

(65) Prior Publication Data

US 2017/0366637 A1    Dec. 21, 2017

(51) Int. Cl.
G06F 15/167 (2006.01)
H04L 29/08 (2006.01)
H04L 29/06 (2006.01)

(52) U.S. Cl.
CPC ...... H04L 67/2842 (2013.01); H04L 67/1095 (2013.01); H04L 67/2852 (2013.01); H04L 67/42 (2013.01)

(58) Field of Classification Search
CPC .. H04L 67/2842; H04L 67/1095; H04L 67/42
USPC ....................................................... 709/213
See application file for complete search history.

(56) References Cited

U.S. PATENT DOCUMENTS

| | | | |
|---|---|---|---|
| 5,897,634 A * | 4/1999 | Attaluri | G06F 16/252 |
| 6,003,115 A * | 12/1999 | Spear | G06F 12/0862 |
| | | | 711/113 |
| 6,732,237 B1 | 5/2004 | Jacobs et al. | |
| 6,772,203 B1 | 8/2004 | Feiertag et al. | |
| 7,251,657 B2 | 7/2007 | Saha et al. | |
| 7,430,638 B2 * | 9/2008 | Kellar | G06F 12/0862 |
| | | | 707/999.101 |
| 7,856,530 B1 | 12/2010 | Mu | |
| 8,095,764 B1 * | 1/2012 | Bauer | G06F 3/0605 |
| | | | 711/162 |
| 8,180,964 B1 * | 5/2012 | Koh | G06F 11/3442 |
| | | | 711/118 |
| 8,788,581 B2 | 7/2014 | Sundarrajan et al. | |
| 8,838,725 B2 * | 9/2014 | Delos Reyes | G06F 16/9574 |
| | | | 709/213 |
| 8,875,094 B2 | 10/2014 | Kalyanasundaram | |
| 10,089,108 B1 * | 10/2018 | Noble | G06F 8/65 |

(Continued)

FOREIGN PATENT DOCUMENTS

| | | |
|---|---|---|
| CN | 104267944 A | 1/2015 |
| WO | 0219114 A2 | 3/2002 |
| WO | 2004023311 A1 | 3/2004 |

OTHER PUBLICATIONS

Shatz, Gur, "Advanced Acceleration: Dynamic Content Caching", Imperva Incapsula, Sep. 23, 2012, 7 pages, <https://www.incapsula.com/blog/advanced-caching-dynamic-through-learning.html>.

(Continued)

*Primary Examiner* — Imad Hussain
(74) *Attorney, Agent, or Firm* — Edward J. Wixted, III

(57) ABSTRACT

A dynamic cache engine designed to perform advanced, dynamic, application-specific data caching, based on multiple application and user parameters included in client requests that are sent to a server.

15 Claims, 10 Drawing Sheets

(56) References Cited

U.S. PATENT DOCUMENTS

| | | | |
|---|---|---|---|
| 2002/0065992 A1* | 5/2002 | Chauvel | G06F 1/206 711/141 |
| 2002/0099732 A1* | 7/2002 | Miller | G06F 8/00 715/201 |
| 2003/0126056 A1* | 7/2003 | Hausman | G06Q 10/10 705/36 R |
| 2004/0133886 A1* | 7/2004 | Wu | G06F 8/4442 717/154 |
| 2006/0236033 A1* | 10/2006 | Guinn | G06F 12/0871 711/118 |
| 2007/0124482 A1* | 5/2007 | Lee | H04L 63/0428 709/228 |
| 2007/0240117 A1* | 10/2007 | Wiles | G06F 8/4442 717/124 |
| 2008/0059943 A1* | 3/2008 | Krevs | G06F 8/65 717/103 |
| 2008/0126831 A1* | 5/2008 | Downey | G06F 11/008 714/4.2 |
| 2009/0327481 A1* | 12/2009 | Rickard | G06F 11/3419 709/224 |
| 2012/0110109 A1* | 5/2012 | Luna | H04L 67/22 709/213 |
| 2012/0198032 A1* | 8/2012 | Fitzgerald | H04W 4/00 709/219 |
| 2013/0024622 A1* | 1/2013 | Martin | H04L 67/2842 711/133 |
| 2013/0031197 A1* | 1/2013 | Delos Reyes | G06F 16/9574 709/213 |
| 2013/0086322 A1 | 4/2013 | Pelletier et al. | |
| 2013/0086324 A1* | 4/2013 | Soundararajan | G06F 12/0813 711/122 |
| 2013/0086325 A1 | 4/2013 | Kim | |
| 2013/0290399 A1* | 10/2013 | Gordon | H04L 67/1097 709/201 |
| 2013/0346475 A1* | 12/2013 | Jasperson | H04L 67/02 709/203 |
| 2013/0346476 A1* | 12/2013 | Jasperson | H04L 67/142 709/203 |
| 2014/0006539 A1* | 1/2014 | Kaplinger | H04L 47/78 709/213 |
| 2014/0164052 A1* | 6/2014 | Pesci-Anderson | G06Q 10/00 705/7.28 |
| 2015/0222724 A1* | 8/2015 | Kaplinger | H04L 47/78 709/217 |
| 2015/0261438 A1* | 9/2015 | Nagaraj | G06F 3/0653 711/113 |
| 2015/0296040 A1* | 10/2015 | Wang | G06F 16/248 709/213 |
| 2016/0338031 A1* | 11/2016 | Wang | H04L 67/2842 |
| 2016/0378666 A1* | 12/2016 | Amrhein | G06F 12/0857 709/213 |
| 2017/0017576 A1* | 1/2017 | Cammarota | G06N 20/00 |
| 2017/0094377 A1* | 3/2017 | Herdrich | H04L 41/5009 |
| 2017/0109184 A1* | 4/2017 | Ramani | G06F 9/45558 |

OTHER PUBLICATIONS

"Controlling what is cached", provided by inventor in post disclosure comments dated Aug. 31, 2015, 2 pages, <http://www-01.ibm.com/support/knowledgecenter/api/content/nl/en-us/SSAW57_8.0.0/com.ibm.websphere.edge.doc/cp/admingd27.html>.

* cited by examiner

DYNAMIC CACHE ENGINE - HIGH AVAILABILITY

MULTI-TIER DYNAMIC DATA CACHING

BACKGROUND

The present invention relates generally to the field of computer memory management, and more particularly to optimizing usage of cache memory.

As of Apr. 1, 2016, the Wikipedia entry for the word "cache" states as follows: "In computing, a cache . . . is a component that stores data so future requests for that data can be served faster; the data stored in a cache might be the result of an earlier computation, or the duplicate of data stored elsewhere. A cache hit occurs when the requested data can be found in a cache, while a cache miss occurs when it cannot. Cache hits are served by reading data from the cache, which is faster than re-computing a result or reading from a slower data store; thus, the more requests can be served from the cache, the faster the system performs . . . . [C]aches have proven themselves in many areas of computing because access patterns in typical computer applications exhibit the locality of reference. Moreover, access patterns exhibit temporal locality if data is requested again that has been recently requested already, while spatial locality refers to requests for data physically stored close to data that has been already requested."

One conventional type of cache is a "dynamic entry cache." In a dynamic entry caching system, cached items are dynamically discarded from the cache after being identified as idle (no longer being accessed or updated).

A conventional client-server application typically uses a server sub-system to service "client requests." In a typical example of a client request: (i) a user clicks on a button or link in a web browser; (ii) the browser formulates a client request including a web page URL; (iii) the browser sends the client request to a web server; (iv) the web server prepares a response, including the contents of a web page at the URL, and sends the response to the browser; (v) the browser receives the response and displays the web page included in the response. Typically, in servicing the client request, three different portions of hardware/software (called "layers") of the server sub-system cooperate as follows: (i) when an end user sends a request using a user interface, a request pipeline is initiated from a "view" layer of the client-server application; (ii) the request pipeline is received by a "controller" layer; and (iii) the controller layer interacts with a respective data model (a "model" layer) to prepare the response and send the response back to the view layer and in turn, to the end user. The three layers ("view", "controller" and "model") maintain respective sub-caching layers within a single dynamic entry cache, which is dedicated to (or "owned" by) the client-server application.

SUMMARY

According to an aspect of the present invention, there is a method, computer program product and/or system that performs the following operations (not necessarily in the following order): (i) generating, by a first application program, a first client request including a first plurality of project-specific parameters corresponding to a project; (ii) receiving, by a server computer, and from the client computer, via network communications, the first client request; and/or (iii) caching a first project-specific data set, based upon the first plurality of project-specific parameters, in a dynamic entry cache. The dynamic entry cache uses a memory space that is separate and distinct from memory space that is used by the first application program.

DETAILED DESCRIPTION

Figure 1A:
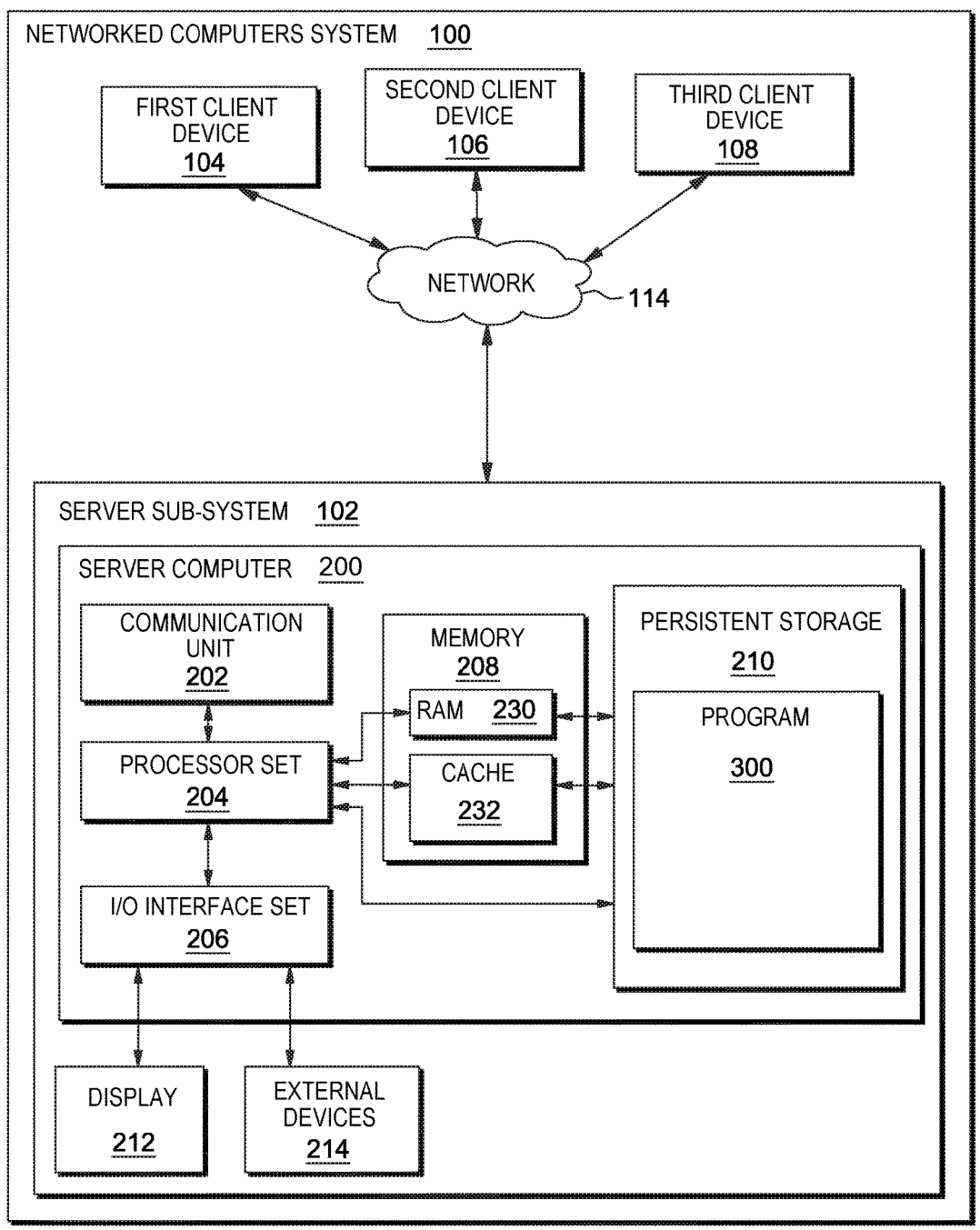
FIG. 1A is a block diagram of a first embodiment of a system according to the present invention.

Embodiments of the present invention provide a mechanism designed to perform dynamic application-specific data caching, based on multiple application variables (sometimes herein referred to as application parameters) included in client requests that are sent to a server. A dynamic cache engine has three components: (i) a request parser; (ii) a dynamic entry caching component; and (iii) a dynamic database caching component, also sometimes herein referred to as a database caching adapter.

The dynamic request parser receives a client request and analyzes it to identify the request type. Based on the request type, the parser identifies certain items to be updated or retrieved (called "listed items"), based on one or more application parameters. The dynamic entry caching component has its own memory space (entry cache tier) that is separate and distinct from application memory space. The dynamic entry caching component compares the listed items with the corresponding parameters (sometimes herein referred to as "variables") which are configured according to the requesting application. If the listed items exist in the entry cache tier, the values corresponding to the listed items are respectively updated or retrieved. If the listed items are not in the entry cache, the list is passed to a database caching adapter associated with a database cache tier. If the listed items are found in the database cache tier, the values corresponding to the listed items are updated or retrieved. If not found in the database cache tier, the items are: (i) updated in the file system; and/or retrieved from the file system and copied into the database cache or the entry cache. Regardless of where the listed items are found, a server response is assembled and returned to the requesting client.

Another aspect of embodiments of the present invention provides a high availability dynamic cache engine that synchronizes project-specific variables between failover nodes of any application cluster, and continues performing the caching of the intercepted run-time items.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
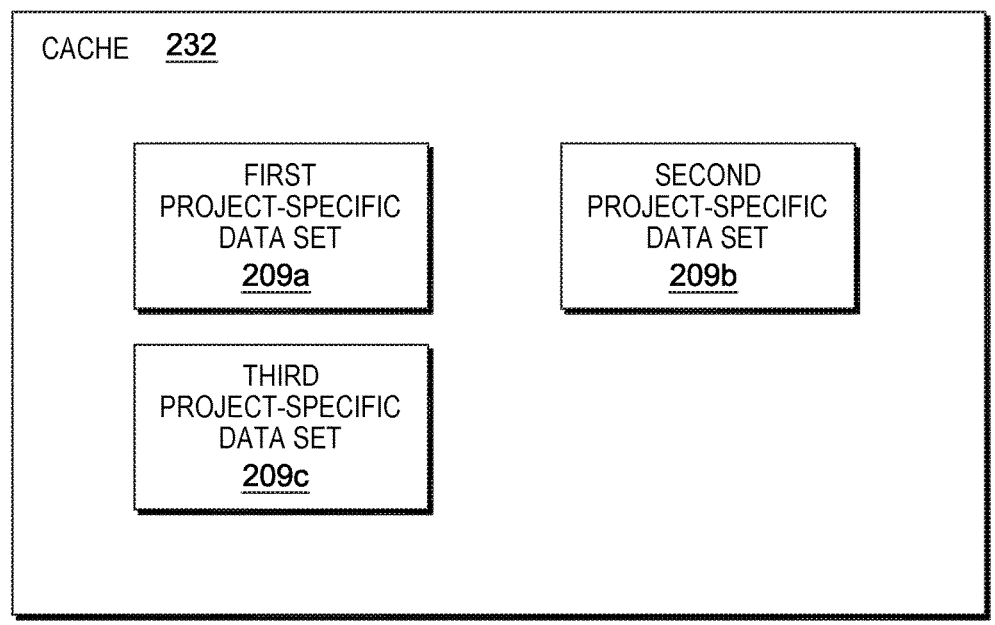
FIG. 1B is a block diagram of a portion of the first embodiment system.

An embodiment of a possible hardware and software environment for software and/or methods according to the present invention will now be described in detail with reference to the Figures. FIGS. 1A and 1B are functional block diagrams illustrating various portions of networked computers system 100, including: server sub-system 102; first, second, and third client devices 104, 106, and 108 respectively; communication network 114; server computer 200; communication unit 202; processor set 204; input/output (I/O) interface set 206; memory device 208; persistent storage device 210; display device 212; external device set 214; random access memory (RAM) devices 230; cache memory device 232; multi-tier caching program 300; cache 232; first project-specific data set, 209a, second project-specific data set, 209b; and third project-specific data set, 209c.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
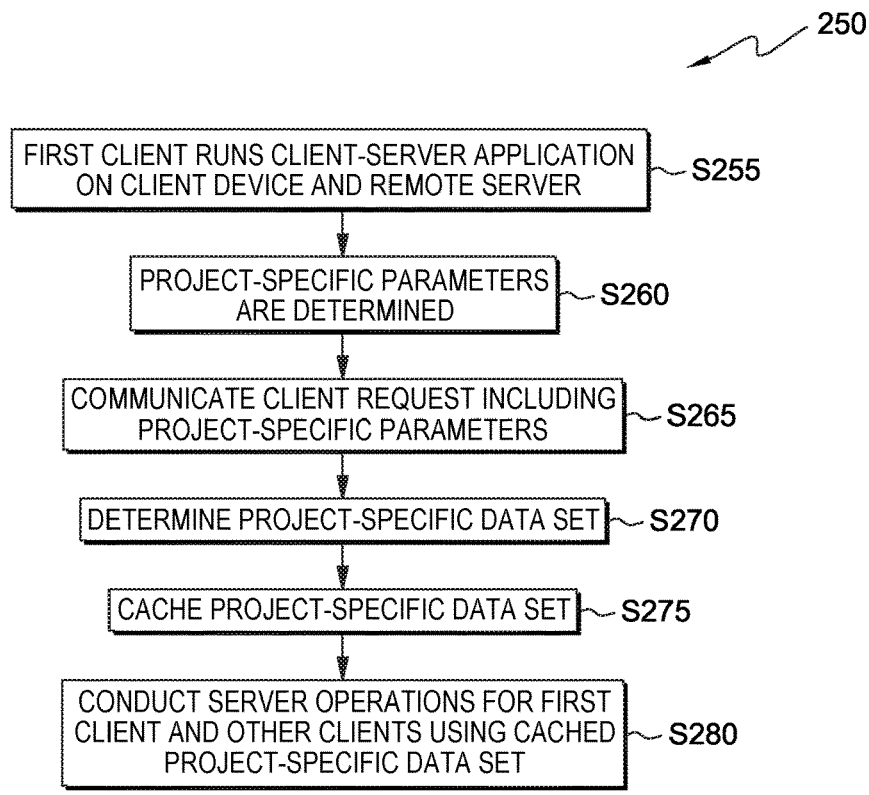
FIG. 2 is a flowchart showing a first embodiment method performed, at least in part, by the first embodiment system.
Figure 3:
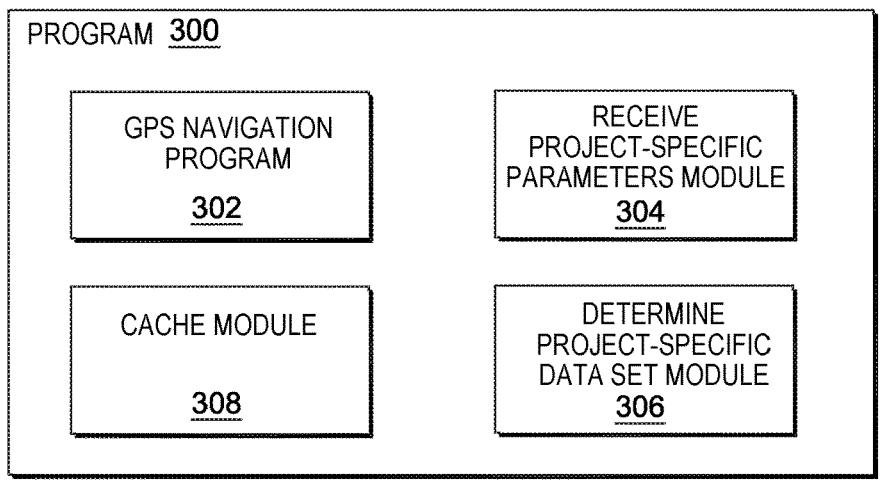
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where GPS navigation program module 302 runs a client-server application in conjunction with first, second and third client devices 104, 106, and 108 respectively (see FIG. 1A) working in cooperation with a remote server. First client device 104 is a smartphone and the client-server application is a GPS navigation program. Alternatively, the type of applications and/or devices to which the present invention may be applied are many and various. As a further example: (i) a first editor uses first client device 104 (which may be a desktop computer running a word processing program) to review and edit a book manuscript in preparation for print publication; (ii) a second editor, concurrently with the first editor, uses second client device 106 (which may be a tablet computer) to generate a table of contents and an index for the publication; and/or (iii) a third editor, concurrently with the first and second editors, uses third client device 108 (which may be a graphics workstation) to adjust dot-gain parameters for color separations for full color images to be included in the publication.

Processing proceeds at operation S260, where GPS navigation program 302 determines project-specific parameters for the GPS navigation program applications respectively running on first, second, and third client devices, 104, 106, and 108 respectively (see FIG. 1A).

When a client runs a client-server application, there are project-specific parameters associated with the running of the client-server application. Some known types of project-specific parameters include: (i) project participant related (for example, parameters that are based on the identity of a user, such as authority to see and/or edit data, or job role of the user); (ii) project timing related (for example, dates of project milestones); (iii) types of data related to the project (for example, relational databases, word processing document file(s), audio/visual files, etc.); (iv) subject matter related (for example, confidential subject matter (for example, financial information), subject matter prone to frequent changes (for example, medical patient monitoring data, meteorological data for weather forecasting), subject matter that needs to avoid even slight data degradation (for example, movie making)); (v) location related (for example, how the project participants and/or project data are distributed geographically and/or logically); (vi) access type (for example, are participants typically editing data, adding data, or merely getting read access to project data); and/or (vii) parameters related to project state and/or sub-state (for example, project and sub-project dates and milestones).

In this example, the project-specific parameters include a location related type project-specific parameter. More specifically, the GPS program maps features within a one-kilometer radius centered on the current GPS location of each of the client devices. The mapping features might include roadways, building structures and current traffic conditions.

Processing proceeds at operation S265 where receive project-specific parameters module 304 receives the project-specific parameters for the client-server application running on the first client device. More specifically, in this example, the project specific parameters include: (i) the current location of the first client device (received from the first client device through network 114 (see FIG. 1A)); and (ii) a radius used to define the extent of the mapping area for each client device actively using GPS navigation program 302 (received from program 302).

Processing proceeds at operation S270 where determine project-specific data set module 306 determines a first project-specific data set for the client-server application running on the first client device, based on the corresponding project-specific parameters. In this example, the data set includes all the map features located within one kilometer of the first client device. In this example, the form and format of the data is determined by protocol(s) designed for storing map data. Alternatively, in other applications, the stored data may have other types of form and format, such as: (i) data files according to a predefined file format (for example, a rich text format for a text file, a jpeg file corresponding to a still visual image); (ii) database record(s); (iii) audio and/or video data suitable for real time streaming; (iv) storage device image files (for example, ISO files that are modelled on compact disc storage devices); (v) code corresponding to hypervisor instructions, data to build and/or maintain a virtual machine and/or processor instructions; and/or (vi) unstructured data.

Processing proceeds at operation S275 where cache module 308 caches the first project specific data set in a dynamic entry cache.

In this embodiment, cache 232 is not a dynamic entry cache. Alternatively, and as will be further discussed, below, in the Further Comments And/Or Embodiments sub-section of this Detailed Description section, the cache may take the form of a dynamic entry cache (according to dynamic entry cache designs now known, or as may be developed in the future). In some installations, it is better to use a dynamic entry cache.

Processing proceeds at operation S280, where GPS navigation program 302 conducts server operations for the first client and other clients that are using the cached first project-specific data set. As mentioned above, the project-specific data set is based upon a location related type of project specific parameter, more specifically, the geographic location of the first client device. In this example, the use of location type parameters is potentially helpful because GPS navigation programs are used to navigate through geographical areas, and the location of the first client device helps determine exactly which geographic area(s) merit caching under this embodiment of the present invention.

Alternatively, in some embodiments of the present invention, project timing related (for example, dates of project milestones) reasons can become a factor in determining whether to cache data. For example, a project in early stages of development, such as a large construction project may undergo a large volume of accesses by a large array of users.

For each user, it may be beneficial to cache portions of the many files under revision while the project is in development. In contrast however, when the project nears completion, relatively few changes are being made to certain portions of the overall data (such as architectural plans), while other portions of the data may still be very active (such as payroll data).

In some embodiments of the present invention, types of data related to the project (for example, relational databases, word processing document file(s), audio/visual files, etc.) can factor into a cache/do not cache determination. For example, with a streaming video file application, caching may be used to buffer portions of the video file as the storage sub-systems can retrieve them, and then relay the file to the user from the cache, at a steady rate.

In some embodiments of the present invention, the subject matter related to a file can affect a determination of whether to cache the file. For example, highly confidential subject matter might be restricted from caching for security reasons, so as to offer less opportunity for a malevolent program to find and retrieve the data. In another example, data that is accessed (read and/or updated) frequently, such as medical patient monitoring data or meteorological data used for weather forecasting, it may be determined that caching the data would offer significant benefit in terms of latency and efficiency of computing resources. In still another example, subject matter that needs to avoid even slight data degradation (for example, movie making)), reducing probability of bit-errors, by avoiding the added copying and relaying of data between non-volatile storage and the cache, might factor into the determination of whether to cache the data.

In some embodiments of the present invention, project-specific caching is based on the type of user accessing the data. For example, for a user who has read-only privileges for a small text file, it may be determined that no benefit would accrue from caching the file contents for that user. The contents need be accessed from storage just once, because with no write privileges, the user would not be causing multiple accesses to the file as would be the case if the user were making edits, periodically saving the file. On the other hand, for a user who has read-write privileges to the same file, where there might be multiple accesses to the file, it could be beneficial to have the file cached to decrease latency for the file accesses.

III. Further Comments and/or Embodiments

Some embodiments of the present invention may recognize one, or more, of the following facts, potential problems and/or potential areas for improvement with respect to the current state of the art: (i) conventional static cache engines based on a single variable do not allow extension for dynamic data caching based on multiple variables; (ii) conventional frameworks provide static caching only (that is, the constituent fields for a variable are declared to certain configuration file(s) (such as an extensible markup language (XML) file); (iii) static caching, if combined with multi-variable caching creates a high probability of application outage, stemming from a large amount of cached data occupying the application memory, if even only small number of user sessions are active; and (iv) multi-variable caching results in application memory outage, since all the cache (based on the combination of multiple variables) is loaded for each user session and occupies the application memory while each individual session is active.

In a conventional client server application for example, server-side caching of application data for any particular tier provides static caching that is either: (i) not dependent on any application variable; and/or (ii) based on a single variable, where the constituent fields for the variable are declared in a configuration file.

Some conventional client server-applications can be understood as having different levels (or tiers) of operation including "model", "view", and "controller", all residing on a server. The client uses the "view" level to build a request. When the client sends the request to the server, the "controller" receives the request and parses it to understand it. The controller sends the request to the "model" level (a "handler"). The model interacts with an application database layer to perform the requested operation and prepare a response. The model sends the response to the controller which forwards it to the client. The client accesses the response via the view layer.

Some embodiments of the present invention may include one, or more, of the following features, characteristics and/or advantages: (i) constituent fields are computed dynamically at run-time; (ii) constituent fields are based on client requests to a server; (iii) works, at least, on applications that use client server architecture; (iv) achieves scalable dynamic caching; (v) optimizes memory usage; (vi) facilitates a multi-tier (for example, an entry level cache of a controller tier, and a database caching tier), scalable configuration, variable-based, dynamic cache engine which is compatible with applications that follow a client server architecture; and/or (vii) the dynamic cache engine is shared by multiple applications having similar project configurations (variable). Further to item (i) in this paragraph, the term "dynamic" means the constituent cache items are computed (determined) at run-time, based on project-specific configurations and combinations. Multiple applications (including applications running on shared servers), using different sets of project-specific variables, share a single dynamic cache engine. The dynamic cache engine uses its own (dedicated) memory slot (also known as memory space), and not the application memory space.

Some embodiments of the present invention have an advanced caching mode, which is a heuristic process. When a page (the resource) is initially considered for caching, the following process is performed: (i) if the server determines that the page is cacheable, the page is cached; (ii) if the server determines that the page content is static, the page is cached and the system starts learning (the learning phase) more about usage of the page, to understand how often the data changes; and (iii) if the server determines the page content is dynamic, the server attempts to validate the determination by observing the resource's behavior.

The learning phase is used to validate that the resource's content is static (does not change over time), across different sessions and different users. If it is found that the page's content is static (does not change over time), the page is cached for progressively longer periods of time. The page content is periodically checked to determine if the page indeed remains static.

If at any point the server determines that the page content changes, the learning phase, with respect to the resource, is suspended for some time.

Some embodiments of the present invention maintain dynamic data structures, including at least one state machine for each resource in the system, to manage the advanced caching mode heuristic process.

In some embodiments of the present invention, the aforementioned learning process results in a significant increase in caching performance and effectiveness.

In some embodiments of the present invention, a dynamic request parser component intercepts individual requests and identifies items specific to each request for which caching is required. The dynamic cache engine performs a multi-tier search for the cached item to include in the response data. If data is not found in the multi-tier search, the dynamic cache engine fetches the raw data from the physical memory and copies it into the tier-specific dynamic cache based on the configured variables specific to an application. A secondary process optimizes the cached data for each tier.

Some embodiments of the present invention plug into any existing application framework, and/or a separate framework with any application. For example, a data consumer process bases caching decisions on certain configuration parameters. The dynamic cache engine parses the individual processing request of the data consumer to identify run-time items that require data caching.

Figure 4:
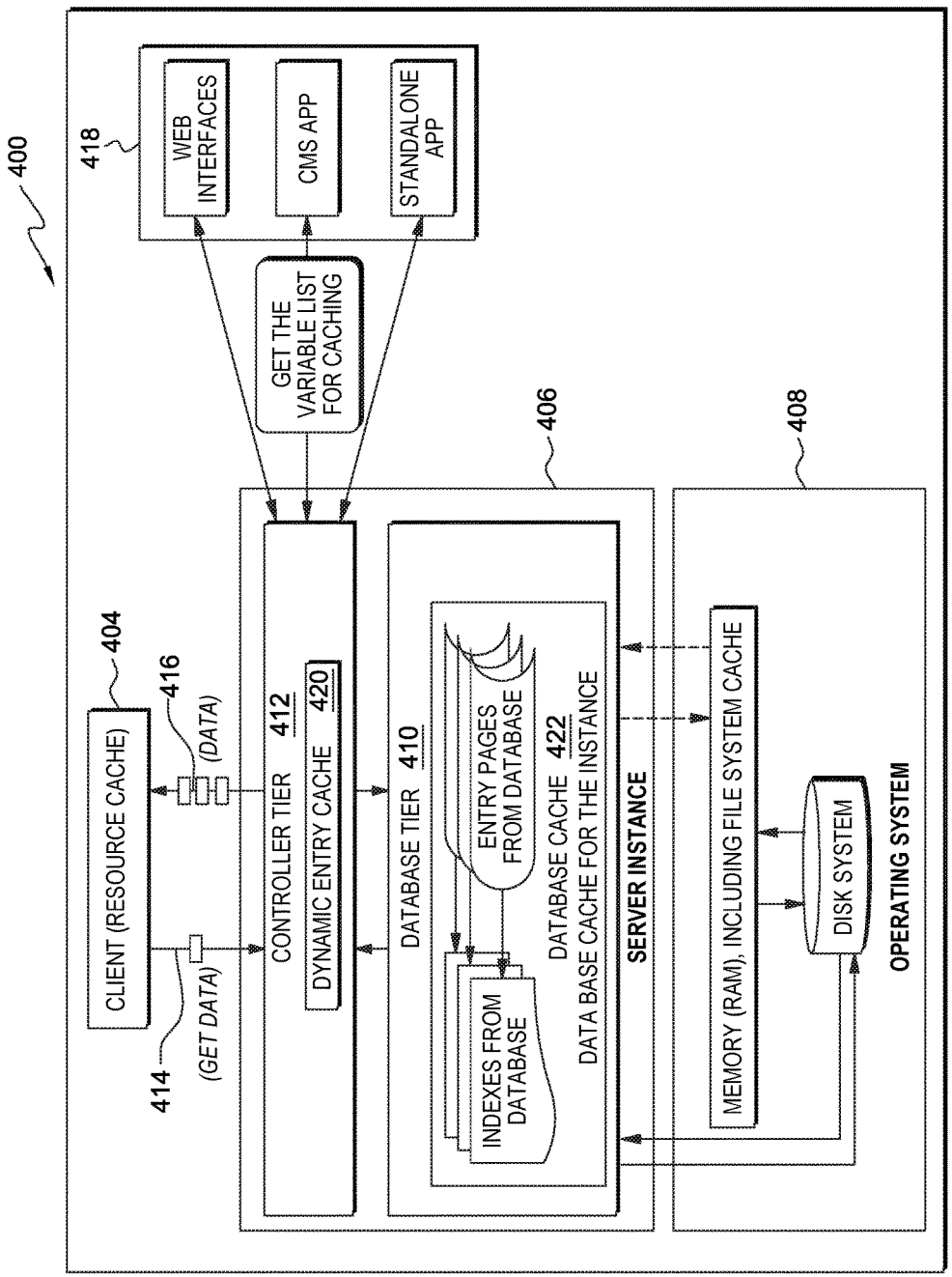
FIG. 4 is a block diagram of a second embodiment of a system according to the present invention.

Client-server application 400 of FIG. 4 (for example, a web interface or a standalone application, etc.) includes: operating system 408; server instance 406; client computer 404; database tier 410; controller tier 412, data communication channels 414 and 416; variable lists 418 (sometimes herein referred to as parameter lists 418); dynamic entry cache 420; and database cache 422. Variable lists 418 identify data sets (see discussion of FIG. 10, below) for caching, based on which type of application(s) (for example, types of applications including web interfaces, content management systems (CMS), and/or standalone applications) are running.

Server instance 406 is one of many possible server instances that run under operating system 408. Database tier 410 and controller tier 412 are within server instance 406.

Some embodiments determine variables (sometimes herein referred to as parameters, project-specific parameters, or project-specific configuration) based on variable lists 418, in accordance with whatever project uses dynamic caching capability at run-time. Entry caching for application elements, with which this capability has been integrated, is performed, based upon the multiple variables.

Figure 5:
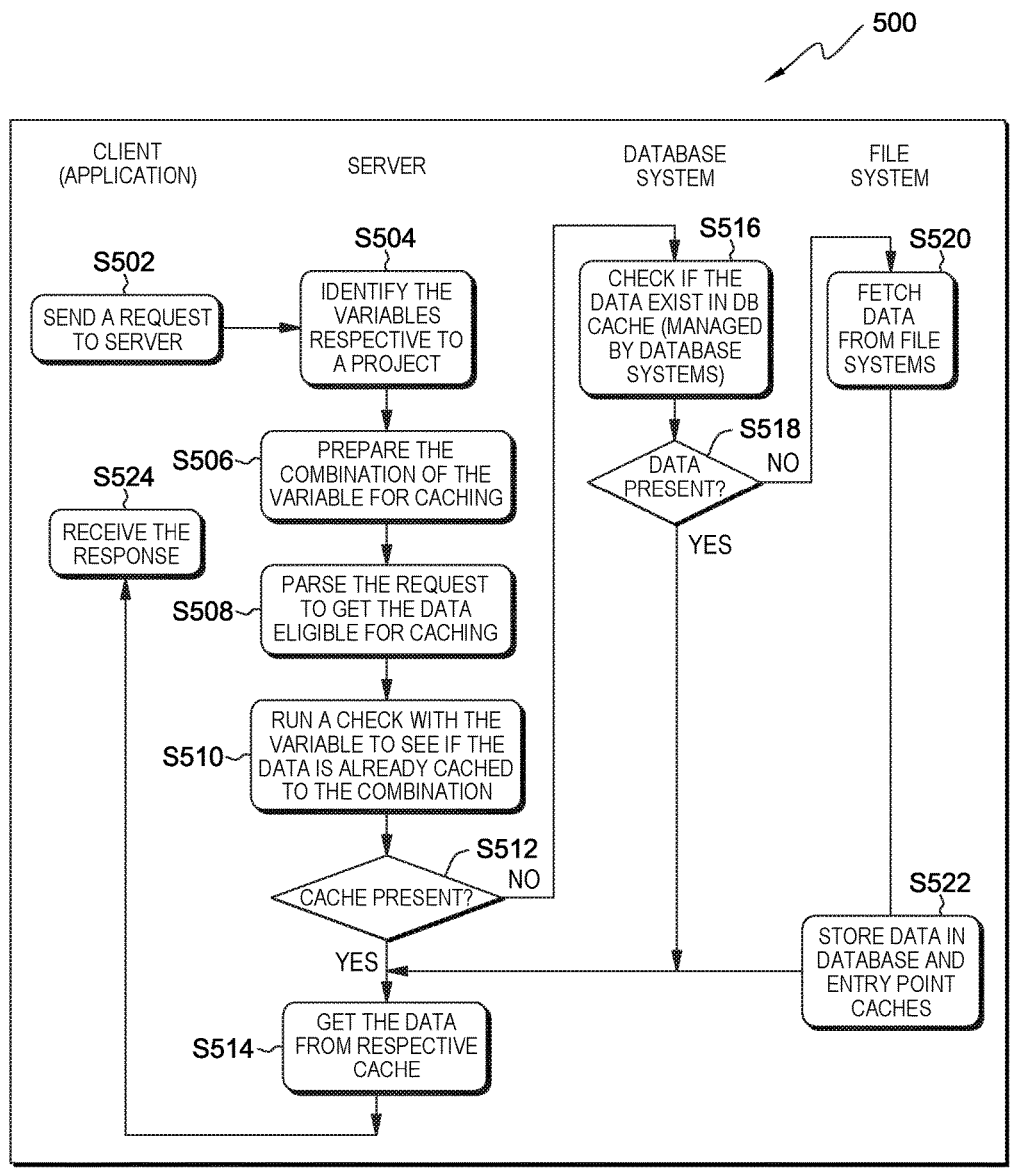
FIG. 5 is a sequence diagram showing a second embodiment method performed, at least in part, by the second embodiment system.

Sequence diagram 500 of FIG. 5 includes the following operations (with process flow among and between the operations as shown by arrows in FIG. 5): S502, S504, S506, S508, S510, S512, S514, S516, S518, S520, S522 and S524.

As shown in FIG. 5, once an application sends a request from client computer 404 to server 406, via data communication channel 414 (see FIG. 4), (operation S502), a request parser of the dynamic cache engine intercepts the request and identifies items for which caching is required (operation S504), based on multiple variables (such as, for example, search results, data list values, field labels, etc.) included in the request. The dynamic cache engine determines the multiple variables based upon one or more project-specific configurations, and/or variable lists 418. The dynamic cache engine compares the multiple variables with the items that require caching. Information identifying items that require caching is obtained from the request parser component of the dynamic cache engine (operation S508). Once an item that needs caching is identified, the dynamic cache engine checks the entry cache of the server for the cache value (operation S510). If the cache value exists (operation S512, "Yes" branch), the engine fetches the value of the item from cache and returns the value to the client application (operation S514) via data communication channel 416 (see FIG. 4). If the cache value, corresponding to the combination of the variables for the fields obtained from request parser, is not present (operation S512, "No" branch), the dynamic cache engine looks in the database cache to get the value according to the combination of the variables and forms the response (operation S516). If the database cache does not contain the value (operation S518, "No" branch), the data is fetched from the flat file (from the file system, for example from a disk drive) where the data is persistently stored (operation S520). The data is then cached in the database cache as well as in the entry point cache, so as to be available from cache the next time it's requested (operation S522). Once the data is cached, the response is returned to the client application (operation S514).

Figure 6:
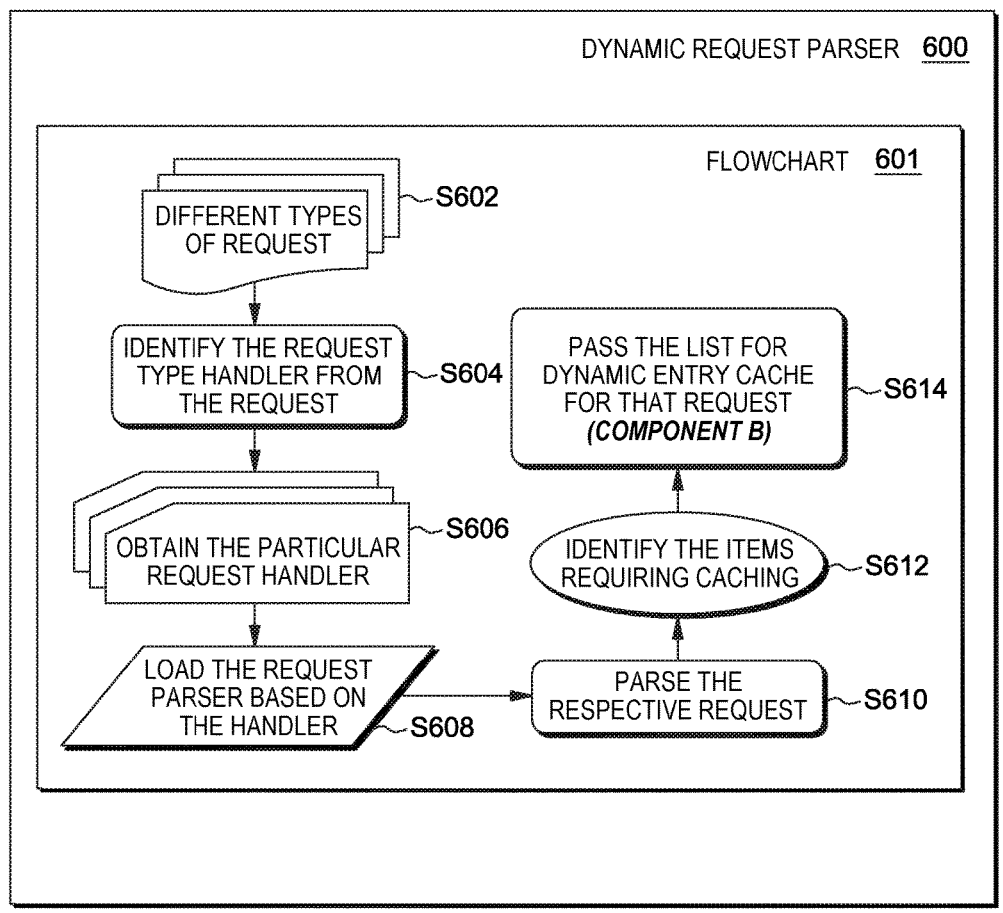
FIG. 6 is a flowchart showing a second embodiment method performed, at least in part, by the second embodiment system.
Figure 7:
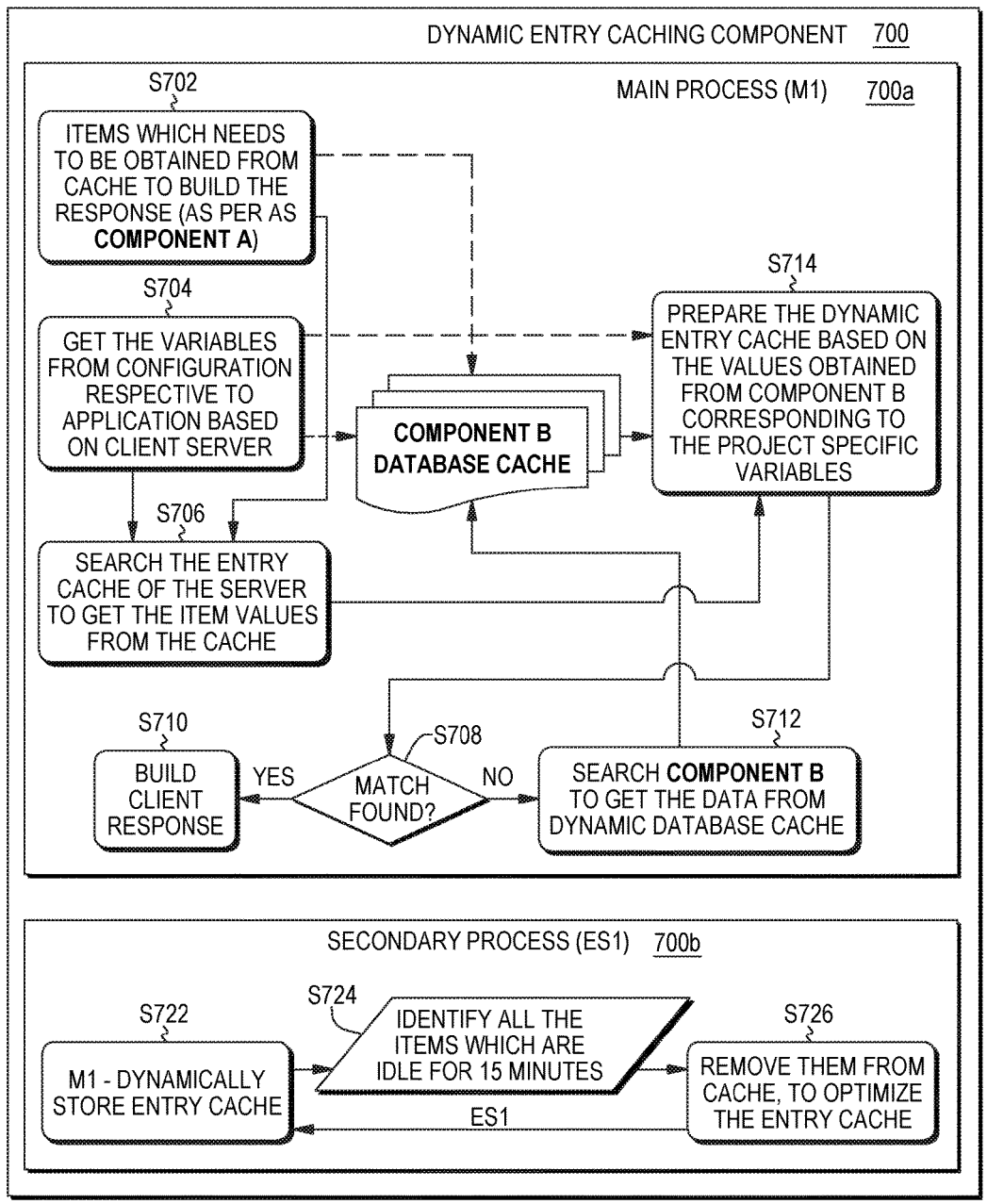
FIG. 7 is a flowchart showing a second embodiment method performed, at least in part, by the second embodiment system.

Some embodiments of the present invention include three components: (i) dynamic request parser; (ii) dynamic entry caching component with a main process (M1) and a secondary process (ES1); and (iii) a dynamic database caching component (component-C) (also referred herein to as database caching adapter) with a main process (M2), and a secondary process (ES2). Methods of these three components will be described in the following few paragraphs, with reference to: FIG. 6 (dynamic request parser); FIG. 7 (dynamic entry caching component); and FIG. 8 (dynamic database caching component).

Flowchart 601 of FIG. 6 shows operations of dynamic request parser 600, in some embodiments of the present invention. Flowchart 601 includes the following operations (with process flow among and between the operations as shown by arrows in FIG. 5): S602, S604, S606, S608, S610, S612, and S614.

Figure 9:
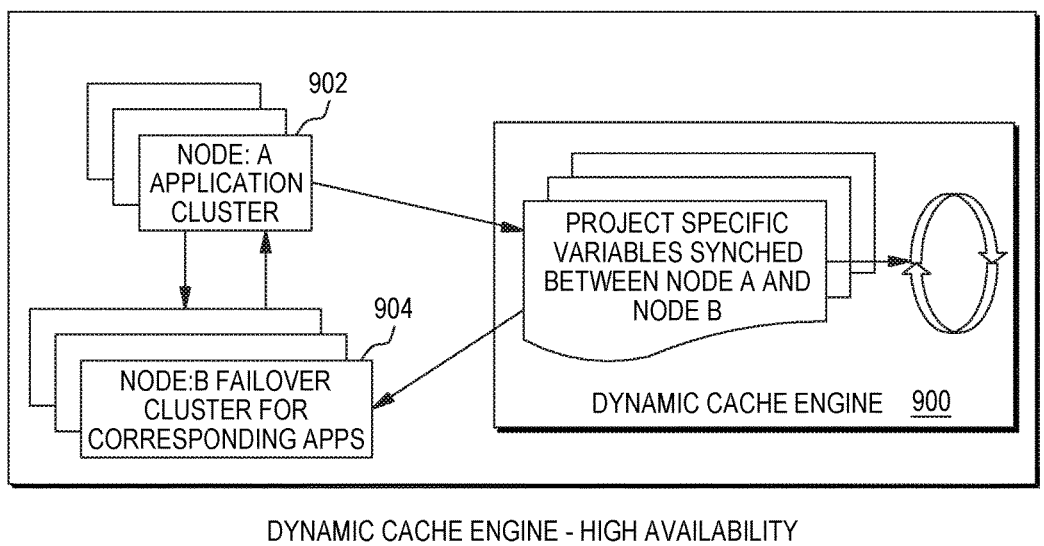
FIG. 9 is a block diagram of a third embodiment of a system according to the present invention.

Dynamic request parser 600 is specific to dynamic cache engine 902 (see FIG. 9). The dynamic request parser: (i) receives, from a requesting client, an application request (operation S602); (ii) identifies the type of the application request, such as, a hypertext transfer protocol (http) request, a file transfer protocol (ftp) request, etc., (operation S604); (iii) obtains a particular request handler based on the application request type (operation S606); (iv) loads the request parser based on the handler (operation S608); (v) parses the application request (operation S610); (vi) identifies and lists the items, such as search result, field labels (for http) etc., that need to be updated or searched in cache (operation S612) based on the variables; and (vii) passes the list of items to dynamic entry caching component 700 of FIG. 7 (operation S614).

Flowcharts 700*a* and 700*b*, of FIG. 7, show operations of dynamic entry caching component 700 in some embodiments of the present invention. Flowchart 700*a* shows operations of the main process (M1) of the dynamic entry caching component. Flowchart 700*b* shows operation of a secondary process (ES1) of the dynamic entry caching component, which optimizes dynamic entry caching.

Flowchart 700*a* of FIG. 7 includes the following operations (with process flow among and between the operations as shown by arrows in FIG. 7): S702, S704, S706, S708, S710, S712, and S714.

In some embodiments of the present invention, main process M1 700*a*, of dynamic entry caching component 700, performs multi-variable based dynamic caching in the entry cache. The dynamic entry caching component receives input (operation S702) from dynamic request parser 600 (see FIG. 6), and compares the input (operation S704) with the variables which are configured according to the relevant application (based on client server architecture). The dynamic entry caching component then searches the entry cache (operation S706) for the combination of variables obtained from the dynamic request parser. If a match is found (operation S708, "Yes" branch), the dynamic entry caching component assembles the client response data (operation S710) and returns the response data to the requesting client.

If a match is not found (operation S708, "No" branch), the dynamic entry caching component sends the combination of variables to database caching adapter 800 of FIG. 8 (see below), to trigger a search for the data in the database cache (operation S712). Once obtained, the data is copied into the entry cache (operation S714) corresponding to the multi-variable combination, and the response data is assembled and returned to the requesting client.

Flowchart 700b of FIG. 7 includes the following operations (with process flow among and between the operations as shown by arrows in FIG. 7): S722, S724, and S726.

In some embodiments of the present invention, secondary process ES1 700b, of dynamic entry caching component 700, optimizes dynamic entry caching. The secondary process ES1 monitors, at regular intervals (for example, at 30 minute intervals), the entry cache, based on variables (operation S722). The secondary process ES1 identifies dynamically cached items, based on the variables, which have been idle for a predefined length of time (for example, 15 minutes) (operation S724) and removes, from the entry cache, items which have been identified as idle (operation S726).

Figure 8:
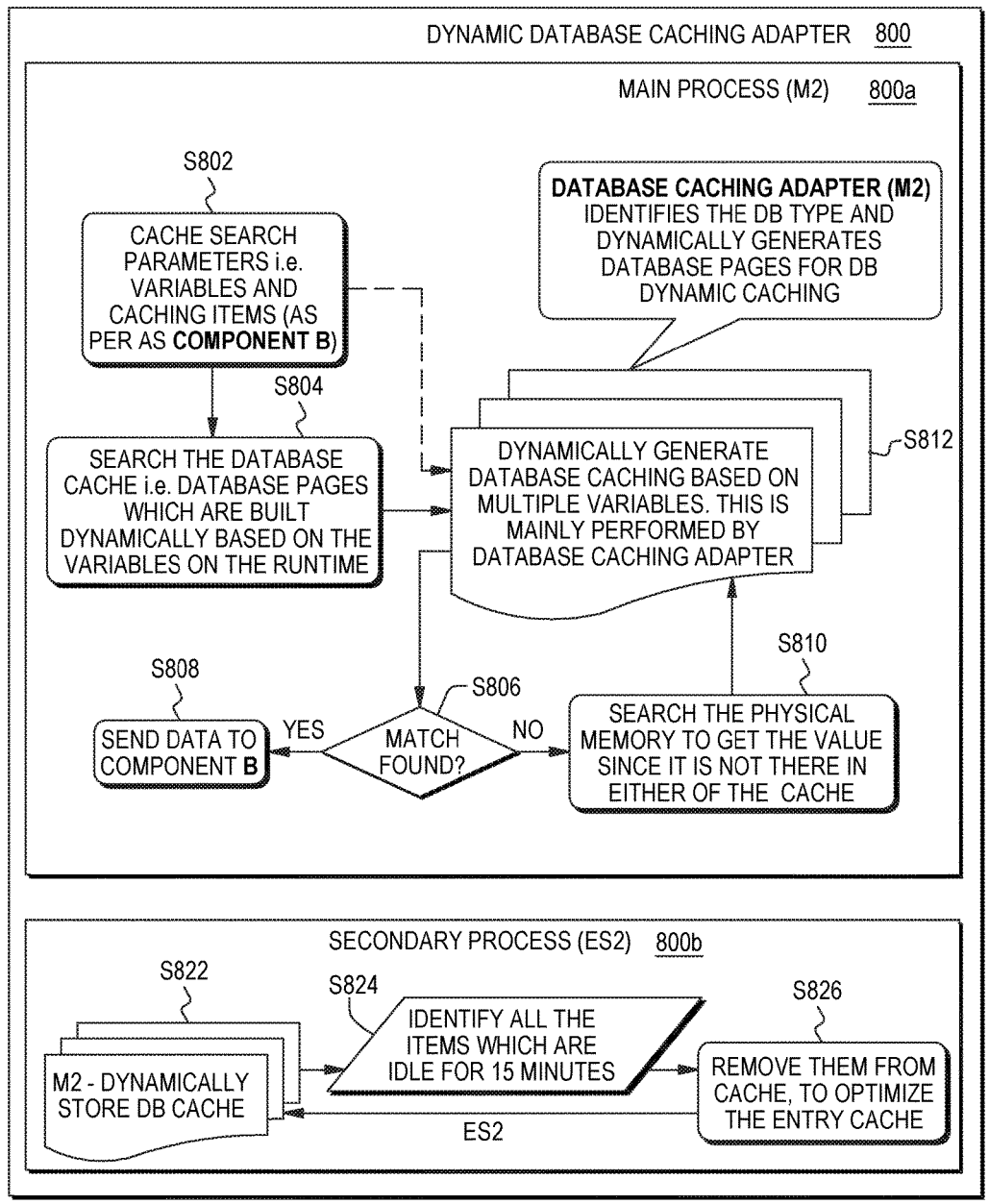
FIG. 8 is a flowchart showing a second embodiment method performed, at least in part, by the second embodiment system.

Flowcharts 800a and 800b, of FIG. 8, show operations of dynamic database caching adapter 800, in some embodiments of the present invention. Flowchart 800a shows operations of the main process (M2) of the dynamic database caching adapter. Flowchart 800b shows operation of a secondary process (ES2) of the dynamic database caching adapter, which optimizes dynamic database caching.

Flowchart 800a of FIG. 8 includes the following operations (with process flow among and between the operations as shown by arrows in FIG. 8): S802, S804, S806, S808, S810 and S812.

Multiple-variable based dynamic caching in the database cache is performed by database caching adapter 800. Once a request for a search in the database cache is received, main process (M2) 800a, of dynamic database caching adapter 800, is triggered. The main process (M2) searches the database cache, based on variables specific to the application request. If the data is found in the database cache, the data is returned to dynamic entry caching component 700 with the result. If the data is not found in the database cache, the data is fetched from physical memory and stored in database cache corresponding to the variable combination. Once data is dynamically cached in the database cache, it is sent back to the dynamic entry caching component.

Flowchart 800b of FIG. 8 includes the following operations (with process flow among and between the operations as shown by arrows in FIG. 7): S822, S824, and S826.

In some embodiments of the present invention, secondary process ES2 800b, of dynamic database caching adapter 800, optimizes dynamic database caching. The secondary process ES2 monitors, at regular intervals (for example, at 30 minute intervals), database cached pages (or other data structures), based on variables (operation S822). The secondary process ES2 identifies dynamically cached pages, based on the variables, which have been idle for a predefined length of time (for example, 15 minutes) (operation S824), and removes, from the database cache, pages which have been identified as idle (operation S826).

As shown in FIG. 9, dynamic cache engine 900 synchronizes project-specific variables between the fail over nodes of any application cluster and continues performing the caching of the intercepted run-time items. For example, if node A 902 fails over to node B 904, dynamic cache engine 900, continues to perform, with no significant performance impact to the client server application.

Some embodiments of the present invention may include one, or more, of the following features, characteristics and/or advantages: (i) provides scalable dynamic caching for any number of constituent fields in each project-specific configuration on entry cache (that is, server side cache excluding the database tier), by parsing any type of request via a built in dynamic request parser; (ii) provides scalable dynamic database tier cache for any number of constituent fields for each variable; (iii) contains a database cache engine which creates or searches the dynamic database cache, based on application-specific variables; (iv) remains highly available in the event of fail over of any application cluster; (v) synchronizes the project configuration between each node for each individual projects; (vi) based on a project-specific configuration; (vii) dynamically caches multiple variables at run-time; (viii) shares the dynamic cache engine among multiple applications having similar project configurations (variables); and/or (ix) provides a dynamic cache engine with high availability.

The following case study is an example that is helpful in understanding some embodiments of the present invention. Consider an application where the field(s) that are displayed for a particular request are dependent on: (i) document state (for example, draft, submitted to supplier, etc.); (ii) entity (for example, a project attribute, people involved, etc.); and (iii) user role (for example, requester, buyer, supplier, etc.). If a first user (for instance, a requester) accesses a document that is in draft state for a given project attribute entity, a first set of fields is displayed to the requester, such as in a user interface, for viewing and/or editing. Data associated with the first set of fields are selected for caching at run-time. If a second user (for instance, a buyer) accesses the same document that is in the same draft state and the same project attribute entity, a second set of fields is displayed to the buyer. Data associated with the second set of fields are selected at run-time for caching. If the buyer accesses the same document that is for the same project attribute entity, but the document is in final release state, rather than draft state, a third set of fields is displayed to the buyer, in which case, data associated with the third set of fields are selected at run-time for caching.

In general, for any application for which the workflow is controlled by multiple variables, embodiments of the present invention provides a scalable, dynamic caching, for any number of constituent fields corresponding to each variable, on entry cache.

Some embodiments of the present invention may include one, or more, of the following features, characteristics and/or advantages: (i) dynamically determines which items are to be cached based on the combination of multiple variables which controls the application flow and/or application usage (for example, how often the item content changes and/or how often it is accessed); and/or (ii) obtains information at run-time regarding variables that control the application flow at any particular instant to determine whether to cache a particular object.

In some embodiments of the present invention, the following steps (steps A through C below) are performed (not necessarily in the order presented) to access the cache (to store or retrieve data respectively to or from the object cache).

Step A. Look up the service to get a handle on the cache object. In some embodiments of the present invention. The lookup is done in the init( ) method of a portlet as shown below:

```
private DistributedMap cacheObject = null;
public void init( ) throws PortletException {
super.init( );
InitialContext ctx;
try {
ctx = new InitialContext( );
    cacheObject = (DistributedMap)
ctx.lookup("services/cache/TestCache");
} catch (NamingException e) {
   e.printStackTrace( );
}}
```

Step B. With a handle on the cache object now obtained (by the portlet in Step A, above), retrieve the data from cache by calling a get( ) method on the object as shown below.
cacheObject.get(Key);

Step C. Store the information into the cache object by calling a put( ) method as shown below.
cacheObject.put(object arg0, object arg1);

Some embodiments of the present invention perform an abstraction on the values that are being cached and use an intelligent wrapper to understand which values are more preferable to the project.

Some embodiments of the present invention may include one, or more, of the following features, characteristics and/or advantages: (i) multiple applications having the same project variables can use the same component of a session-based variable caching engine since the engine includes a failover feature (for applications sharing the same server); (ii) an enterprise application can use its own session-based variable cache engine; (iii) once a server receives a request from any application, the dynamic cache engine uses its built-in request parser (see FIG. 6) to intercept the request and identify the session-based variables which require caching based on multiple variables such as search results, data list values, field labels, etc.; (iv) the dynamic cache engine determines the variables based on the project-specific configuration and compares the variables against the session-based items requiring caching, which are obtained from the request parser component (see dynamic request parser 600 of FIG. 6) of the dynamic cache engine (see dynamic cache engine 900 of FIG. 9); and (v) once an item is identified, the session-based variable cache of the server is checked for the cache value, and if the cache value exists, the cached value of the session-based variable which has been cached by the cache engine is returned to the client.

In some embodiments of the present invention, any enterprise application can be integrated with the session-based variable caching engine. For example, consider a word processing application that displays to the user fields based on a document state and user role. A user with a role of "buyer" logs in to an application and views a draft document (for example, a text document of a commercial contract that is in negotiation). A set of fields (for example, "consideration" and "warranties") is available, for display and/or editing, to the buyer and flagged for session-based variable caching. The set of fields is different from a set of fields (for example, "main operative clause" and "consideration") that would be available to a user with a role of "production supervisor" who logs in to the application and views the draft document. Later, after the contract is finalized and executed, it is given a state of "final". All fields of the document are then flagged for session-based caching when viewed by a buyer or a production supervisor (that is the variable combinations of "buyer/final" and "production supervisor/final"). More generally, for each combination of project-specific variables (there can be many variables and many combinations of the variables, in some embodiments of the present invention), the session-based caching of the pertinent items for each combination of variables promotes better performance at run-time.

TABLE 1

(Step 1—Identification of session based variables)

| Component | Main Process | Secondary Process | Project Variables | Scenario |
| --- | --- | --- | --- | --- |
| Dynamic Request Parser | Active | Active | No role of project variables at this phase | When a request comes in from client to server for identification of the session based variables. |
| Dynamic Entry Caching | Inactive | Inactive | Project variables come into play in second scenario. See Table 2 (Step 2-Building cache with session based variables) below. | |
| Dynamic Cache Engine-High Availability | Active | Active | No role of Project variables at this phase | |

TABLE 2

(Step 2—Building cache with session based variables)

| Component | Main Process | Secondary Process | Project Variables | Scenario |
| --- | --- | --- | --- | --- |
| Dynamic Request Parser | Inactive | Inactive | No role of Project variables at this phase | When the dynamic request parser has parsed the request and identified the cached items, the cache needs to be built according to the session specific variables (see Table 1, Step 1-Identification of the session based variables, above), along with the combination of project configurations. |
| Dynamic Entry Caching | Active | Active | Project variables or configuration comes into play to build the cache | |
| Dynamic Cache Engine-High Availability | Active | Active | No role of project variables at this phase. This is a separate process which manages the availability of the cache component | |

Some embodiments of the present invention may include one, or more, of the following features, characteristics and/or advantages: (i) can be used by any application of client/server type architecture; (ii) can be used by any application of a tiered approach; (iii) use a multi-tier, dynamic caching capability based on multiple variables to optimize cache memory usage; (iv) can be implemented within client/server architecture; (v) can be implemented in peer-to-peer type communication protocol; (vi) can be implemented in inter-process communication (IPC) type protocol; (vii) integration between the caching component and applications are implementation specific; (viii) can be implemented via a message bus; (ix) can be implemented via a web type interface; and/or (x) can be implemented via an application programming interface (API).

Some embodiments of the present invention have a system and method where: (i) any client server architecture can use multi-tier capability to achieve scalable dynamic caching at optimum memory usage; (ii) multiple applications having a common configuration share a single instance of the multi-tier dynamic component; and/or (iii) able to dynamically cache multiple variables via an optimal and scalable caching engine and integration.

In some embodiments of the present invention, a multi-tier dynamic cache component manages the caching for the application with which it is integrated. The entire caching process manages the cache component memory. Roles and responsibilities are assigned at the time of implementation and deployment. For example, the multi-tier dynamic cache component can be owned by a configuration management team responsible for creating place-holders for new variables, while the actual applications self-manage the contents of these place-holders/variables.

Some embodiments of the present invention may include one, or more, of the following features, characteristics and/or advantages: (i) the elements to be cached are computed (determined) dynamically, at run-time, by the dynamic parser; (ii) fits on any tier of any computer program; (iii) does not require a controlling device; and/or (iv) includes caching failover capability for high availability of the caching component.

Some embodiments of the present invention may include one, or more, of the following features, characteristics and/or advantages: (i) data caching is done at tiers beyond the http header and database where different variables in the application/system (typically data from tables or other sources) are cached dynamically; (ii) the elements to be cached are determined dynamically at run-time (requires no prior specification or configuration); (iii) the cache engine dynamically computes (determines) which items to cache, based on a combination of multiple variables which controls the application flow; (iv) controls the documents and objects, which are to be cached, based on a combination of multiple variables which control the application flow; (v) provides scalable dynamic caching for any number of constituent fields in each variable, in the entry cache (for example, a server side cache excluding database tier) by parsing any type of request via a built-in dynamic request parser; (vi) provides scalable dynamic database tier cache for any number of constituent fields in each variable; (vii) contains a database cache engine which creates or searches the dynamic database cache based on the application specific variables; (viii) the dynamic cache engine remains highly available in the event of fail over of any application cluster (node); and/or (ix) synchronizes the project configuration among nodes for each individual project.

Further with respect to item (i) in the paragraph above, some embodiments of the present invention perform dynamic variable-based caching, in addition to cache control variable(s) specified in an http header, or other application/system caching procedures.

Figures 10A, 10B:
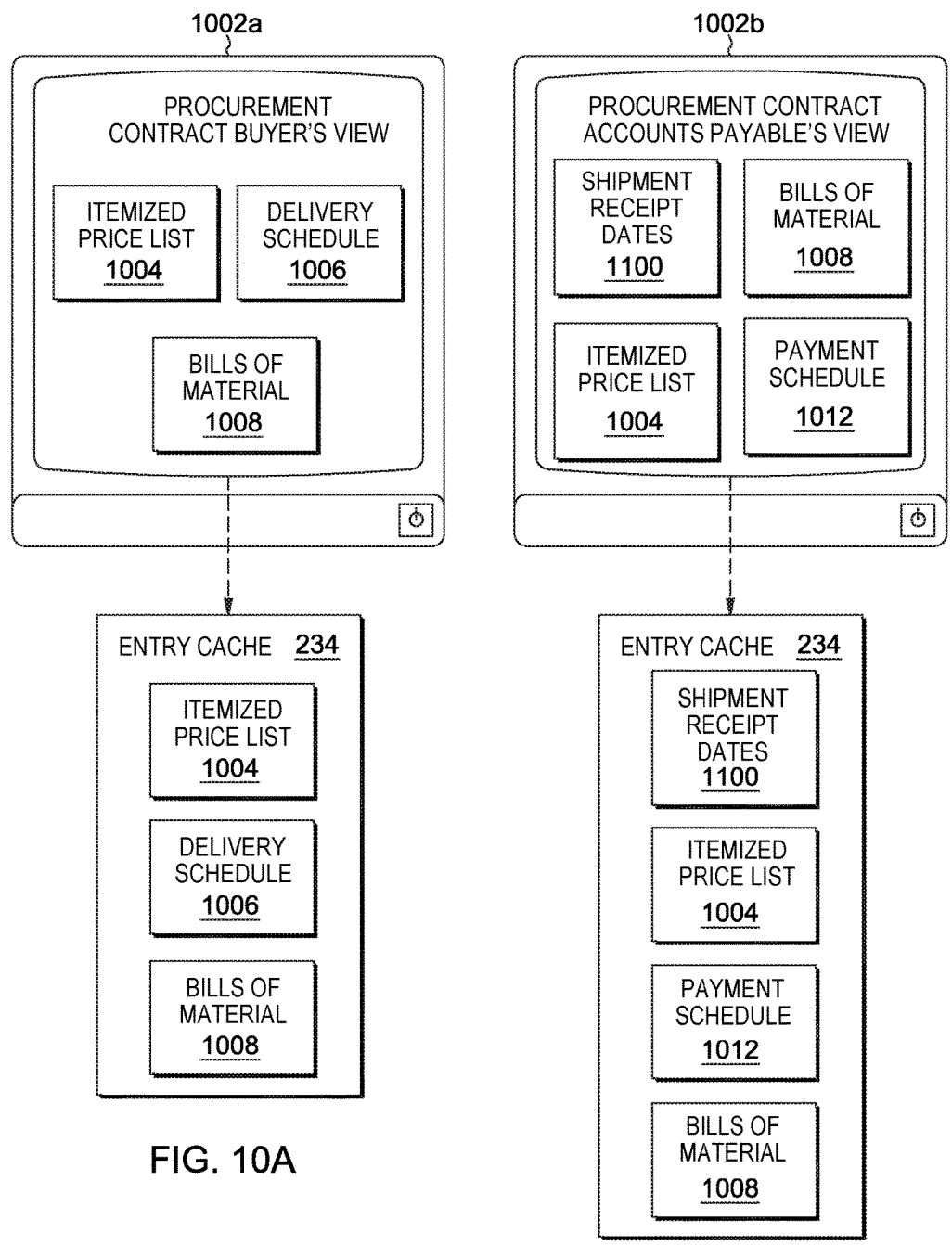
FIG. 10A is a screenshot showing information that is generated by software according to embodiments of the present invention.
FIG. 10B is a screenshot showing information that is generated by software according to embodiments of the present invention.

Screenshot 1002a of FIG. 10A, shows a set of document fields of a procurement contract as displayed to a buyer in a first embodiment of the present invention. The buyer is given visibility and/or editing authority to a set of fields including: itemized price list 1004; delivery schedule 1006; and bills of material 1008. In this embodiment, data corresponding to the fields displayed to the buyer are cached in entry cache 234.

Screenshot 1002b of FIG. 10B, shows a set of document fields of the procurement contract as displayed to an accounts payable manager in the first embodiment. The manager is given visibility and/or editing authority to a set of fields including: itemized price list 1004; bills of material 1008; shipment receipt dates 1100; and payment schedule 1012. In this embodiment, data corresponding to the set of fields displayed to the manager are cached in entry cache 234.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Dynamic caching: Dynamic caching, as opposed to static caching, means the caching rules (in particular, the rules that govern which data elements are cached relative to a request received from a client computer running application software), are determined at application run-time, based on: (i) configuration of the application software; (ii) configuration of the client computer; (iii) the user of the software; (iv) and/or the data on which the software is operating.

What is claimed is:

1. A computer-implemented method comprising:
receiving a first client request, generated by a first application program, the first client request including: (i) a request to open a first document, (ii) a first user role, and (iii) a first plurality of project-specific parameters associated with the first document in combination with the first user role, including a first project specific parameter;
determining a first project-specific data set based at least in part on the first project-specific parameter;

opening the first document;
populating the first document at least with the first project-specific data set; and
caching the first project-specific data set in a dynamic entry cache;
wherein:
the dynamic entry cache uses a memory space that is separate and distinct from memory space that is used by the first application program; and
the first project-specific parameter is selected from the group consisting of: a parameter related to a project participant, a parameter related to project timing, a parameter related to a type of data related to the project, a parameter related to project subject matter, a parameter related to location of a user, a parameter related to project data, a parameter related to user access to project data, and a parameter related to project state.

2. The computer-implemented method of claim 1, wherein:
the first plurality of project-specific parameters is based on a plurality of parameters which, at least in part, control the flow of the first application program.

3. The computer-implemented method of claim 1 further comprising:
receiving a second client request, generated by the first application program, the second client request including: (i) a request to open a second document, (ii) a second user role, and (iii) a second plurality of project-specific parameters including a second project specific parameter associated with the second document in combination with the second user role;
determining a second project-specific data set based at least in part on the second project specific parameter;
opening the second document;
populating the second document at least with the second project-specific data set; and
caching the second project-specific data set in the dynamic entry cache.

4. The computer-implemented method of claim 1 further comprising:
synchronizing the first plurality of project-specific parameters among a plurality of failover nodes of an application cluster.

5. The computer-implemented method of claim 1 wherein the project-specific parameters include all of the following types of project-specific parameters: (i) project participant related; (ii) project timing related; (iii) types of data related to the project; (iv) parameters related to project subject matter; (v) parameters related to location of a user and/or project data; (vi) parameters related to user access to project data; and/or (vii) parameters related to project state and/or sub-state.

6. A computer program product comprising a computer readable storage medium having stored thereon program instructions programmed to perform:
receiving a first client request, generated by a first application program, the first client receiving a first client request, generated by a first application program, the first client request including: (i) a request to open a first document, (ii) a first user role, and (iii) a first plurality of project-specific parameters associated with the first document in combination with the first user role, including a first project specific parameter;
determining a first project-specific data set based at least in part on the first project-specific parameter;
opening the first document; populating the first document at least with the first project-specific data set; and
caching the first project-specific data set in a dynamic entry cache;
wherein:
the dynamic entry cache uses a memory space that is separate and distinct from memory space that is used by the first application program; and
the first project-specific parameter is selected from the group consisting of: a parameter related to a project participant, a parameter related to project timing, a parameter related to a type of data related to the project, a parameter related to project subject matter, a parameter related to location of a user, a parameter related to project data, a parameter related to user access to project data, and a parameter related to project state.

7. The computer program product of claim 6, wherein:
the first plurality of project-specific parameters is based on a plurality of parameters which, at least in part, control the flow of the first application program.

8. The computer program product of claim 6 further comprising
program instructions programmed to perform:
receiving a second client request, generated by the first application program, the second client request including: (i) a request to open a second document, (ii) a second user role, and (iii) a second plurality of project-specific parameters including a second project specific parameter associated with the second document in combination with the second user role;
determining a second project-specific data set based at least in part on the second project specific parameter;
opening the second document;
populating the second document at least with the second project-specific data set; and
caching the second project-specific data set in the dynamic entry cache.

9. The computer program product of claim 6 further comprising:
fourth program instructions programmed to synchronize the first plurality of project-specific parameters among a plurality of failover nodes of an application cluster.

10. The computer program product of claim 6 wherein the project-specific parameters include all of the following types of project-specific parameters: (i) project participant related; (ii) project timing related; (iii) types of data related to the project; (iv) parameters related to project subject matter; (v) parameters related to location of a user and/or project data; (vi) parameters related to user access to project data; and/or (vii) parameters related to project state and/or sub-state.

11. A computer system comprising:
a processor(s) set; and
a computer readable storage medium;
wherein:
the processor(s) set is structured, located, connected and/or programmed to run program instructions stored on the computer readable storage medium; and
the program instructions include program instructions programmed to perform:
receiving a first client request, generated by a first application program, the first client request including: (i) a request to open a first document, (ii) a first user role, and (iii) a first plurality of project-specific parameters associated with the first document in combination with the first user role, including a first project specific parameter;

determining a first project-specific data set based at least in part on the first project-specific parameter;
opening the first document;
populating the first document at least with the first project-specific data set; and
caching the first project-specific data set in a dynamic entry cache;
wherein:
   the dynamic entry cache uses a memory space that is separate and distinct from memory space that is used by the first application program; and
   the first project-specific parameter is selected from the group consisting of: a parameter related to a project participant, a parameter related to project timing, a parameter related to a type of data related to the project, a parameter related to project subject matter, a parameter related to location of a user, a parameter related to project data, a parameter related to user access to project data, and a parameter related to project state.

12. The computer system of claim 11, wherein:
the first plurality of project-specific parameters is based on a plurality of parameters which, at least in part, control the flow of the first application program.

13. The computer system of claim 11 further comprising program instructions programmed to perform:

receiving a second client request, generated by the first application program, the second client request including: (i) a request to open a second document, (ii) a second user role, and (iii) a second plurality of project-specific parameters including a second project specific parameter associated with the second document in combination with the second user role;
determining a second project-specific data set based at least in part on the second project specific parameter;
opening the second document;
populating the second document at least with the second project-specific data set; and
caching the second project-specific data set in the dynamic entry cache.

14. The computer system of claim 11 further comprising:
fourth program instructions programmed to synchronize the first plurality of project-specific parameters among a plurality of failover nodes of an application cluster.

15. The computer system of claim 11 wherein the project-specific parameters include all of the following types of project-specific parameters: (i) project participant related; (ii) project timing related; (iii) types of data related to the project; (iv) parameters related to project subject matter; (v) parameters related to location of a user and/or project data; (vi) parameters related to user access to project data; and/or (vii) parameters related to project state and/or sub-state.

\* \* \* \* \*